United States Patent
Yu

(10) Patent No.: US 10,124,535 B2
(45) Date of Patent: Nov. 13, 2018

(54) MAIN BODY OF BICYCLE SADDLE HAVING AUXILIARY FUNCTIONAL PIECE AND METHOD OF MANUFACTURING THE SAME

(71) Applicant: VELO ENTERPRISE CO., LTD., Taichung (TW)

(72) Inventor: Tsai-Yun Yu, Taichung (TW)

(73) Assignee: VELO ENTERPRISE CO., LTD., Taichung (TW)

( * ) Notice: Subject to any disclaimer, the term of this patent is extended or adjusted under 35 U.S.C. 154(b) by 79 days.

(21) Appl. No.: 15/214,807

(22) Filed: Jul. 20, 2016

(65) Prior Publication Data

US 2017/0036724 A1 Feb. 9, 2017

(30) Foreign Application Priority Data

Aug. 3, 2015 (TW) .............................. 104125138 A

(51) Int. Cl.
| | |
|---|---|
| *B62J 1/00* | (2006.01) |
| *B29C 65/48* | (2006.01) |
| *B29C 43/20* | (2006.01) |
| *B29C 43/34* | (2006.01) |
| *B29C 43/52* | (2006.01) |

(Continued)

(52) U.S. Cl.
CPC ........ *B29C 65/4815* (2013.01); *B29C 43/203* (2013.01); *B29C 43/34* (2013.01); *B29C 43/50* (2013.01); *B29C 43/52* (2013.01); *B29C 65/5042* (2013.01); *B62J 1/20* (2013.01); *B62J 1/26* (2013.01); *B29K 2021/00* (2013.01); *B29K 2075/00* (2013.01); *B29L 2031/3094* (2013.01)

(58) Field of Classification Search
CPC ......... B62J 1/20; B62J 1/26; B62J 1/18; B62J 1/00; B62J 1/22; B29C 43/203; B29C 43/34; B29C 43/206; B29C 43/50; B29C 43/52; B29C 65/4815; B29C 65/00; B29K 2075/00; B29K 2120/00; B29L 2031/3094
USPC ..... 156/145, 290, 308.4; 264/260, 266, 267, 264/261; 297/214, 195.1, 215.16, 452.41, 297/DIG. 1
See application file for complete search history.

(56) References Cited

U.S. PATENT DOCUMENTS

| | | |
|---|---|---|
| 4,026,600 A | 5/1977 | Kutaguchi |
| 4,781,774 A | 11/1988 | Steward |

(Continued)

FOREIGN PATENT DOCUMENTS

| | | |
|---|---|---|
| DE | 102013206727 | 10/2014 |
| EP | 1919683 | 12/2009 |

*Primary Examiner* — Chi Q Nguyen
(74) *Attorney, Agent, or Firm* — Browdy and Neimark, PLLC

(57) ABSTRACT

A main body of a bicycle saddle includes an elastomer provided on a top surface thereof with a recess, a cover layer covering the top surface and having a concave area corresponding to the recess, and an auxiliary functional piece embedded in the concave area. The main body is manufactured by attaching a contacting surface of the cover layer to a mold cavity of a forming mold by vacuum suction to make a protrusion of the inner wall or a piece material glued to the contacting surface and including the auxiliary functional piece prop up the cover layer to form the concave area, forming the elastomer in the mold cavity, and embedding the auxiliary functional piece in the concave area or exposing the auxiliary functional piece on the contacting surface.

18 Claims, 9 Drawing Sheets

(51) Int. Cl.
*B29C 43/50* (2006.01)
*B29C 65/50* (2006.01)
*B62J 1/20* (2006.01)
*B62J 1/26* (2006.01)
B29K 75/00 (2006.01)
B29K 21/00 (2006.01)
B29L 31/30 (2006.01)

(56) References Cited

U.S. PATENT DOCUMENTS

| | | | |
|---|---|---|---|
| 4,815,361 A | 3/1989 | Chiarella | |
| 5,108,076 A * | 4/1992 | Chiarella | B62J 1/18 297/214 |
| 5,441,676 A | 8/1995 | Bigolin | |
| 5,714,108 A | 2/1998 | Girardi | |
| 6,030,035 A * | 2/2000 | Yates | B62J 1/18 297/195.1 |
| 6,059,359 A | 5/2000 | Cassani | |
| 6,066,277 A | 5/2000 | Lee | |
| 6,095,601 A | 8/2000 | Yu | |
| 6,290,794 B1 * | 9/2001 | Yates | B62J 1/002 156/145 |
| 6,343,839 B1 | 2/2002 | Simons, Jr. | |
| 6,409,865 B1 * | 6/2002 | Yates | B62J 1/00 156/214 |
| 7,022,275 B2 | 4/2006 | Bigolin | |
| 8,128,164 B2 * | 3/2012 | Segato | B62J 1/007 297/202 |
| 8,236,218 B2 | 8/2012 | Terreni | |
| 9,745,010 B2 | 8/2017 | Bailie | |
| 2004/0195871 A1 | 10/2004 | Lee | |
| 2005/0046245 A1 | 3/2005 | Yu | |
| 2008/0018147 A1 | 1/2008 | Ybarrola | |
| 2009/0039688 A1 | 2/2009 | Wyner | |
| 2009/0061146 A1 | 3/2009 | Segato | |
| 2010/0013278 A1 | 1/2010 | Segato | |
| 2010/0045084 A1 | 2/2010 | Segato | |
| 2013/0174971 A1 | 7/2013 | Cassani | |
| 2014/0319717 A1 | 10/2014 | Yu | |

* cited by examiner

MAIN BODY OF BICYCLE SADDLE HAVING AUXILIARY FUNCTIONAL PIECE AND METHOD OF MANUFACTURING THE SAME

BACKGROUND OF THE INVENTION

1. Field of the Invention

The present invention relates generally to bicycle saddles and more particularly to a main body of a bicycle saddle, which has an auxiliary functional piece, and a method of manufacturing the main body.

2. Description of the Related Art

A main body of a conventional bicycle saddle primarily includes an elastomer, a rigid bottom shell and a cover layer. The elastomer is made of foam material such as expanded polyurethane (hereinafter referred to as PU), expanded ethylene-vinyl acetate (hereinafter referred to as EVA) or expanded polyethylene (hereinafter referred to as PE) for providing appropriate cushion and support. The bottom shell is mounted to the bottom of the elastomer for supporting the whole main body of the saddle and being connected with a seat post of the bicycle through other elements. The cover layer, which may be made of synthetic plastic leather for example, covers the top and the periphery of the elastomer for being contacted with the cyclist when the bicycle saddle is in use.

For preventing the cyclist sitting on the bicycle saddle stably from slipping due to smooth surface of the cover layer, some main bodies of the bicycle saddles may be provided on the top thereof with protrusions. Alternately, the surface of the cover layer may be provided with anti-slip pieces glued thereto for increasing the friction between the main body of the bicycle saddle and the cyclist, thereby providing anti-slip effect. However, the main body of the bicycle saddle, which is provided on the top thereof with protrusions, is liable to make the cyclist uncomfortable; the main body of the bicycle saddle, which is provided with anti-slip pieces glued to the surface of the cover layer, has the problem that the anti-slip pieces are liable to escape or peel off.

SUMMARY OF THE INVENTION

The present invention has been accomplished in view of the above-noted circumstances. It is an objective of the present invention to provide a main body of a bicycle saddle, which has an auxiliary functional piece, providing anti-slip effect and comfort to user. Further, the auxiliary piece is not liable to escape or peel off.

To attain the above objective, the present invention provides a main body of a bicycle saddle, which includes an elastomer, a cover layer, and an auxiliary functional piece. The elastomer has a top surface provided with at least one recess. The cover layer covers the top surface of the elastomer and has a contacting surface for being contacted by a user, and a concave area corresponding to the recess. The auxiliary functional piece is embedded in the concave area.

With the design of the present invention, the cover layer provides appropriate anti-slip effect because of having the concave area. Besides, compared with the conventional main body of the bicycle saddle having protrusions on the top of the main body, the main body of the bicycle saddle of the present invention provides a sufficient comfort to the user. Furthermore, the auxiliary functional piece may be an anti-slip piece for improving the anti-slip effect of the main body of the bicycle saddle, and the anti-slip piece is less possible to escape or peel off because it is embedded in the concave area of the cover layer with or without glue. It will be appreciate it that the auxiliary functional piece is not limited to the anti-slip piece. For the auxiliary functional piece, a cooling piece, a vibration-absorbing piece, or a pattern piece having a specific pattern expression, such as the expression of a trademark, may be used depending on usage requirements.

Preferably, the auxiliary functional piece has a functional surface which is exposed on the contacting surface of the cover layer and accommodated in the concave area. In other words, the user can see the functional surface of the auxiliary functional piece shown on the contacting surface of the cover layer; however, the functional surface is not flush with or higher than the contacting surface seen by the user, but a little lower than the contacting surface. In this way, the friction between the user and the contacting surface of the cover layer is less possible to cause the auxiliary functional piece to escape or peel off.

It is another objective of the present invention to provide a method of manufacturing the aforesaid main body of the bicycle saddle, which can achieve the aforesaid effect.

To attain the above objective, the present invention provides a method of manufacturing the main body of the bicycle saddle, which includes the steps of:

a) attaching the contacting surface of the cover layer to an inner wall of a mold cavity of a forming mold by vacuum suction in a way that a protrusion of the inner wall props up a part of the cover layer to form the part of the cover layer into the concave area;

b) heating a base material in the mold cavity of the forming mold to form the base material into the elastomer in a way that the elastomer is formed with the recess corresponding in shape to the protrusion and the cover layer is combined with the elastomer; and c) taking a combination of the cover layer and the elastomer out of the mold cavity, and then embedding the auxiliary functional piece in the concave area of the cover layer.

To attain the above objective, the present invention provides another method of manufacturing the main body of the bicycle saddle, which in the steps of:

a) gluing a piece material, which includes the auxiliary functional piece, to the contacting surface of the cover layer;

b) attaching the contacting surface of the cover layer to an inner wall of a mold cavity of a forming mold by vacuum suction in a way that the piece material props up a part of the cover layer to form the part of the cover layer into the concave area;

c) heating a base material in the mold cavity of the forming mold to form the base material into the elastomer in a way that the elastomer is formed with the recess corresponding in shape to the piece material and the cover layer is combined with the elastomer; and d) taking a combination of the cover layer, the elastomer and the piece material out of the mold cavity, and exposing the auxiliary functional piece on the contacting surface of the cover layer.

In other words, the piece material may include not only the auxiliary functional piece. Therefore, in the step d), the piece material may be partially removed to make the auxiliary functional piece be exposed on the contacting surface of the cover layer.

Preferably, the piece material may include a sacrifice piece glued to a functional surface of the auxiliary functional piece; in the step d), the sacrifice piece is removed from the auxiliary functional piece so that the functional surface of the auxiliary functional piece is exposed on the contacting surface of the cover layer and accommodated in the concave area. This means, the piece material having the sacrifice piece may be used in the manufacturing process and the sacrifice piece is removed in the step d) so that in the finished main body of the bicycle saddle, the functional surface of the auxiliary functional piece is a little lower than the contacting surface seen by the user. In this way, the whole auxiliary functional piece is accommodated in the concave area, so the friction between the user and the contacting surface of the cover layer is less possible to cause the auxiliary functional piece to escape or peel off.

Preferably, the sacrifice piece may be made of cardboard. Besides, the sacrifice piece may be glued to the functional surface of the auxiliary functional piece by means of a double-sided tape. In this way, the piece material is easy in manufacturing, and the sacrifice piece can be easily removed in the step d).

Preferably, the piece material may include a hot melt adhesive film disposed on a gluing surface of the auxiliary functional piece; in the step a), the piece material is thermocompressed so that the auxiliary functional piece is glued to the contacting surface of the cover layer by means of the hot melt adhesive film. In this way, the auxiliary functional piece can be glued to the contacting surface of the cover layer firmly.

More preferably, in the step a), the auxiliary functional piece may be glued to the contacting surface of the cover layer by means of the hot melt adhesive film by a way that a jig is disposed on the contacting surface of the cover layer, the piece material is disposed in a through hole of the jig, and then the jig, the cover layer and the piece material are thermocompressed. In this way, the auxiliary functional piece can be disposed on the required position precisely.

More preferably, in the step a), the piece material may be glued to the contacting surface of the cover layer by a way that a jig is disposed on the contacting surface of the cover layer and the piece material is disposed in a through hole of the jig.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein:

FIGS. 6-12 are schematic views illustrating the manufacturing process of a main body of a bicycle saddle according to a second preferred embodiment of the present invention, wherein FIGS. 6-7 are exploded perspective views and FIGS. 8-12 are sectional views.

DETAILED DESCRIPTION OF THE INVENTION

Referring to FIGS. 1-5, a main body 10 of a bicycle saddle according to a first preferred embodiment of the present invention primarily includes an elastomer 20, a cover layer 30, and three auxiliary functional pieces 40 (unlimited in amount).

Figure 5:
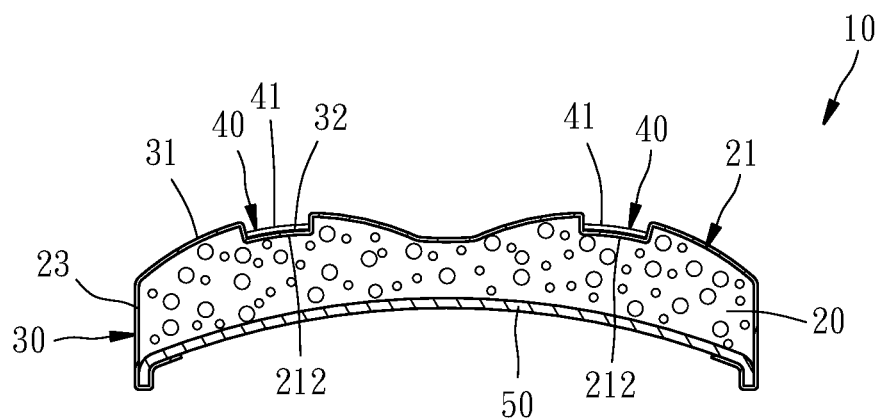

The elastomer 20 is made of foam material, which is usually closed cell foam, such as EVA, PE, or PU, for providing the elastomer 20 ability of cushion and support. However, the material of the elastomer 20 is not limited to the aforesaid materials. As shown in FIG. 5, the elastomer 20 has a top surface 21. The top surface is provided with three recesses 212, only two of which are shown in FIG. 5. In fact, the recesses 212 are actually equal in amount to the auxiliary functional pieces 40.

Figure 1:
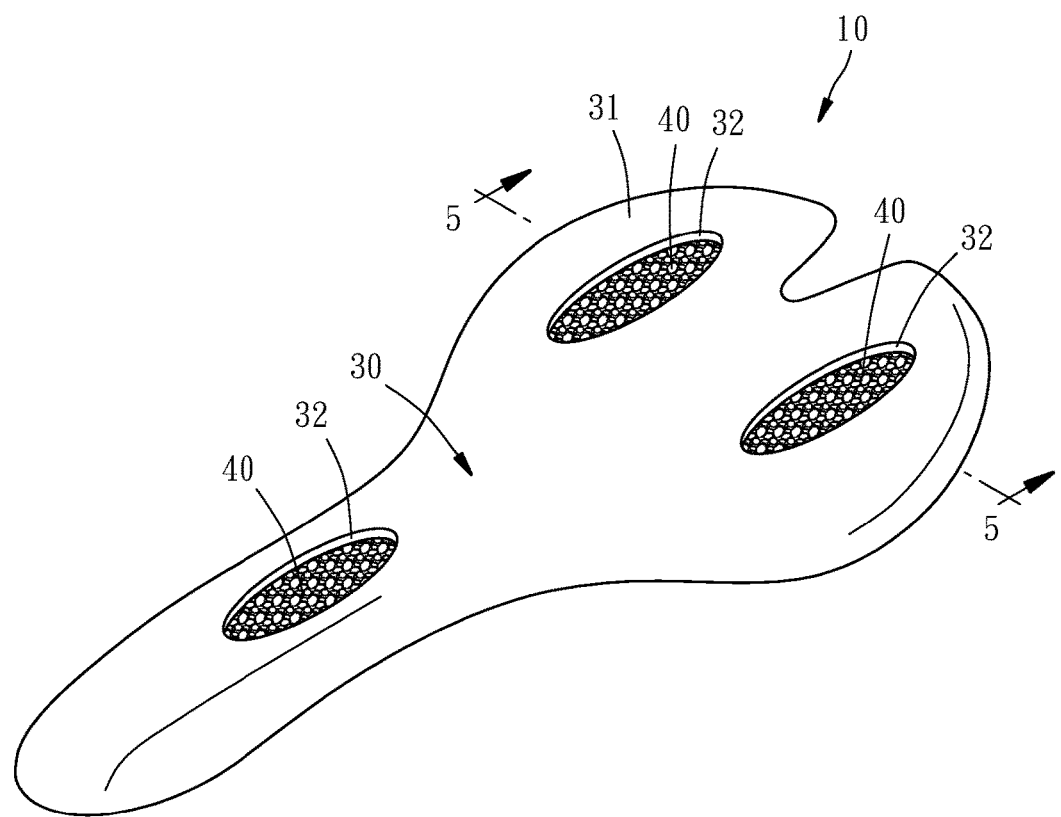
FIG. 1 is a schematic perspective view of a main body of a bicycle saddle according to a first preferred embodiment of the present invention.

The cover layer 30 may, but not limited to, be synthetic leather, plastic leather, cloth material, and so on. The cover layer 30 tightly covers and fits with the top surface 21 and a circumferential surface 23 of the elastomer 20. In addition, there is usually a bottom shell 50 mounted to the bottom of the elastomer 20. The bottom shell 50 is a rigid shell made of plastics. The periphery of the cover layer 30 is folded back to the periphery of the bottom of the bottom shell 50 and fixed there. Since the formation of the bottom shell 50 is less related to the technical feature of the present invention, the details are thereby not specified here. As shown in FIG. 1 and FIG. 5, the cover layer 30 has an exposed contacting surface 31 for being contacted by the user, i.e. the cyclist of the bicycle. The cover layer 30 has three concave areas 32 (equal in amount to the recesses 212) corresponding to the recesses 212 respectively.

The auxiliary functional pieces 40 are glued to the contacting surface 31 of the cover layer 30 and embedded in the concave areas 32 respectively. The auxiliary functional pieces 40 may, but not limited to, be anti-slip pieces with rough surfaces, cooling pieces made of cooling material (ex. gel material), vibration-absorbing pieces made of vibration-absorbing material (ex. silica gel), or pattern pieces providing a specific pattern expression (ex. the expression of trademark), depending on usage requirements. Each of the auxiliary functional pieces 40 has a functional surface 41 exposed on the contacting surface 31 of the cover layer 30. For example, in the case that each auxiliary functional piece 40 is an anti-slip piece, the functional surface 41 thereof is a rough surface providing the anti-slip effect; in the case that each auxiliary functional piece 40 is a pattern piece, the functional surface 41 thereof is the surface having a pattern.

In this embodiment and the following second preferred embodiment, each of the auxiliary functional pieces 40 is completely accommodated in the concave area 32 of the cover layer 30, so each of the functional surfaces 41 is also accommodated in the concave area 32. In other words, the user can see the functional surface 41 of each auxiliary functional piece 40 shown on the contacting surface 31 of the cover layer 30; however, each functional surface 41 is not flush with or higher than the contacting surface 31 seen by the user, but a little lower than the contacting surface 31. In this way, the friction between the user and the contacting surface 31 of the cover layer 30 is less possible to cause the auxiliary functional pieces 40 to escape or peel off.

Figure 2:
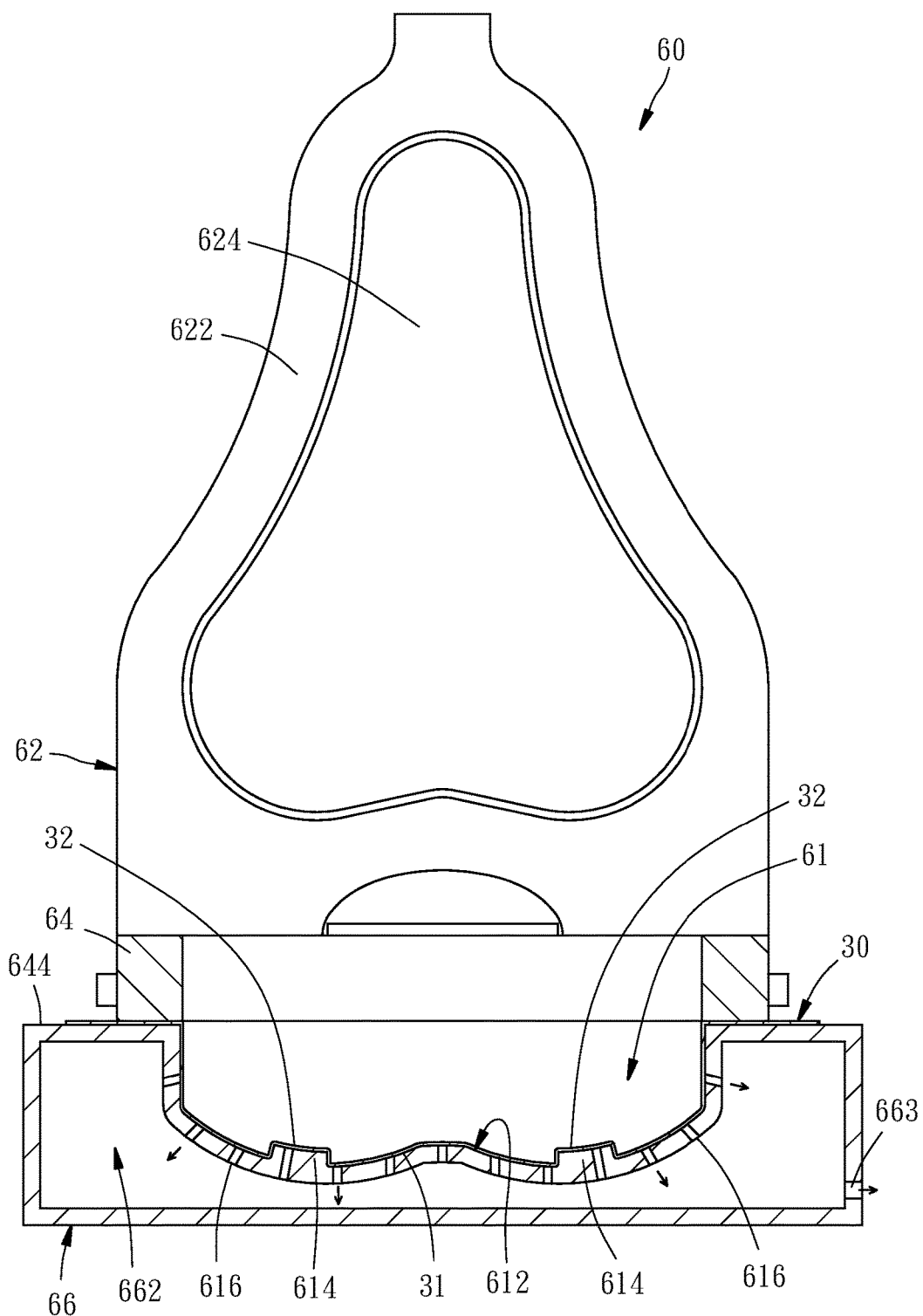
FIGS. 2-5 are schematic sectional views illustrating the manufacturing process of the main body of the bicycle saddle according to the first preferred embodiment of the present invention, wherein the sectional views of the components of the main body of the bicycle saddle are shown in the figures and the sectional views are associated to the line 5-5 in FIG. 1.

In this embodiment, the method of manufacturing the main body 10 of the bicycle saddle includes the following steps.

a) As shown in FIG. 2, attach the contacting surface 31 of the cover layer 30 to an inner wall 612 of a mold cavity 61 of a forming mold 60 by vacuum suction in a way that three protrusions 614 (equal in amount to the auxiliary functional pieces 40, the recesses 212 and the concave areas 32) of the inner wall 612 prop up parts of the cover layer 30 to form the parts of the cover layer 30 into the concave areas 32.

In this embodiment, the forming mold 60 includes an upper die 62, a pressing frame 64 and a lower die 66, which are pivotally connected with each other, and the in cavity 61 is located at the lower die 66. The upper die 62 has a bottom surface 622, and a protrusion 624 protruded from the bottom surface 622. The internal contour of the pressing frame 64 is approximately the same in shape with the external contour of the protrusion 624. The lower die 66 is a shell provided therein with a space 662 and provided at one side thereof with an air exhausting passage 663 which communicates with the space 662. The mold cavity 61 is concaved from a top surface 664 of the lower die 66 and approximately shaped as the main body 10 of the bicycle saddle. The inner wall 612 of the mold cavity 61 is provided with a plurality of through holes 616 communicating with the space 662.

Figure 3:
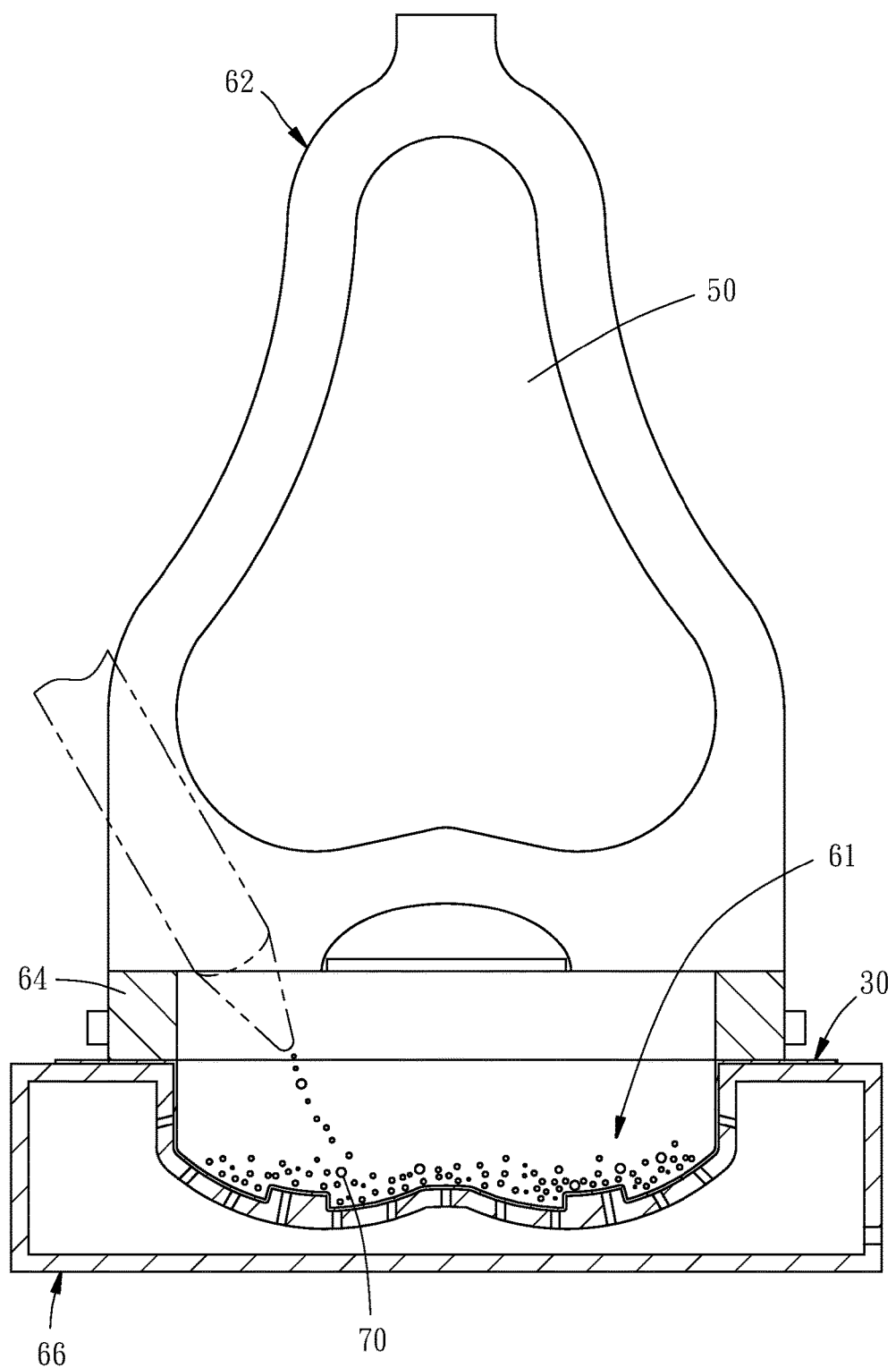
Figure 4:
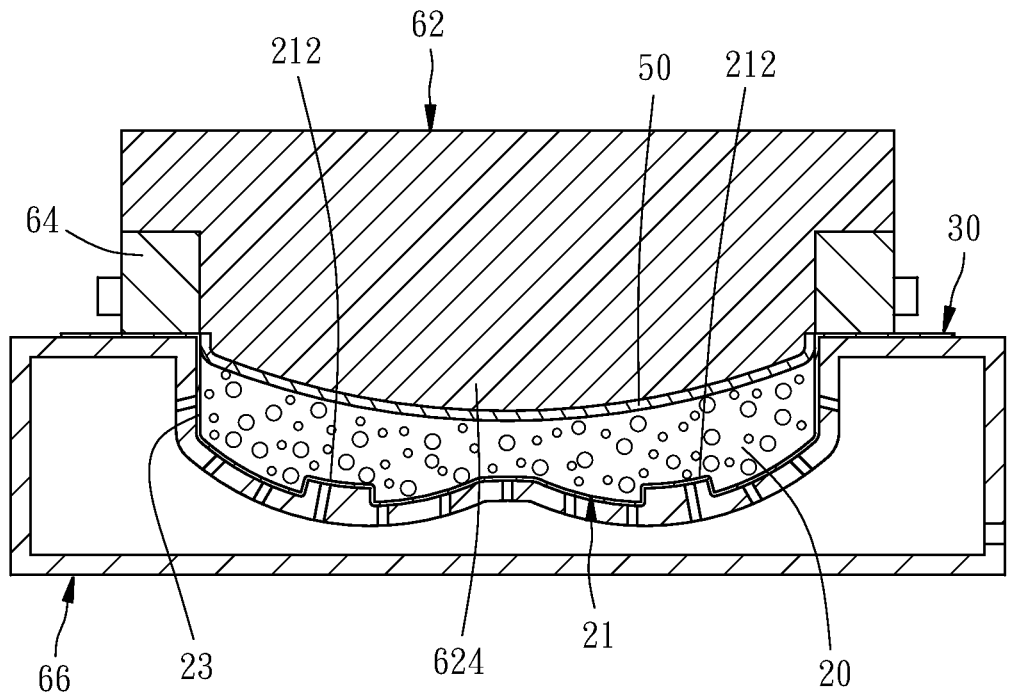

In the step a), the cover layer 30 is placed on the top surface 664 of the lower die 66, and then the pressing frame 64 is pressed on the top surface 664 with the cover layer 30 disposed therebetween. The cover layer 30 is tightly attached to the inner wall 612 of the mold cavity 61 by a way that the air in the space 662 and the mold cavity 61 is exhausted through the air exhausting passage 663 to create a vacuum in the space 662.

b) As shown in FIGS. 3-4, heat a base material 70 that is filled in the mold cavity 61 of the forming mold 60 to form the base material 70 into the elastomer 20 in a way that the elastomer 20 is formed with the recesses 212 corresponding in shape to the protrusions 614 and the cover layer 30 is combined with the elastomer 20.

In this embodiment, the base material 70 is a liquid foamable material which is a mixture of a plastic material, a foaming agent and other additive. The plastic material may, but not limited to, be EVA, PE, PU, and so on. When the lower die 66 is not yet covered with the upper die 62 as shown in FIG. 3, the base material 70 is injected or poured into the mold cavity 61, and the bottom shell 50 is disposed at the protrusion 624 of the upper die 62. After that, the lower die 66 is covered with the upper die 62 as shown in FIG. 4, so that the upper die 62 is pressed on the pressing frame 64 and the mold cavity 61 becomes enclosed. Then, the base material 70 in the enclosed mold cavity 61 is heated to be expanded and formed into the elastomer 20 by the forming mold 60. Specifically speaking, the base material 70 is expanded and formed into the elastomer 20 between the bottom shell 50 and the cover layer 30; meanwhile, the cover layer 30 is combined with the top surface 21 and the circumferential surface 23 of the elastomer 20, and the bottom shell 50 is combined with the bottom of the elastomer 20.

It is to be mentioned that the bottom shell 50 is not limited to be combined with the elastomer 20 in the step b), which means the bottom shell 50 may not be disposed in the forming mold 60 in the step b). The bottom shell 50 may be combined with the elastomer 20 after the elastomer 20 is formed, or even after the following step c).

c) As shown in FIG. 5, take the combination of the cover layer 30 and the elastomer 20 out of the mold cavity 61, and then embed the auxiliary functional pieces 40 in the concave areas 32 of the cover layer 30.

After the step c) is accomplished, the manufacture of the main body 10 of the bicycle saddle is almost finished except that the periphery of the cover layer 30 should be embellished. For example, the periphery of the cover layer 30 may be folded back to the periphery of the bottom of the bottom shell 50, and then the periphery of the cover layer 30 is fixed at the periphery of the bottom of the bottom shell 50 by means of glue or staple. The aforesaid process of embellishing the periphery of the cover layer 30 may be performed before the auxiliary functional pieces 40 are glued to the concave areas 32.

As mentioned above, each of the auxiliary functional pieces 40 may be an anti-slip piece, a cooling piece, a vibration-absorbing piece, a pattern piece, and so on. In this embodiment, the auxiliary functional pieces 40 are embedded in or even further glued to the concave areas 32 after the recesses 212 of the elastomer 20 and the concave areas 32 of the cover layer 30 are formed. Therefore, the auxiliary functional pieces 40 are convenient to be glued to the cover layer 30 and removed from the cover layer 30, so that the user can change the auxiliary functional pieces 40 according to usage requirements or replace the auxiliary functional piece 40 when it is damaged.

Figure 6:
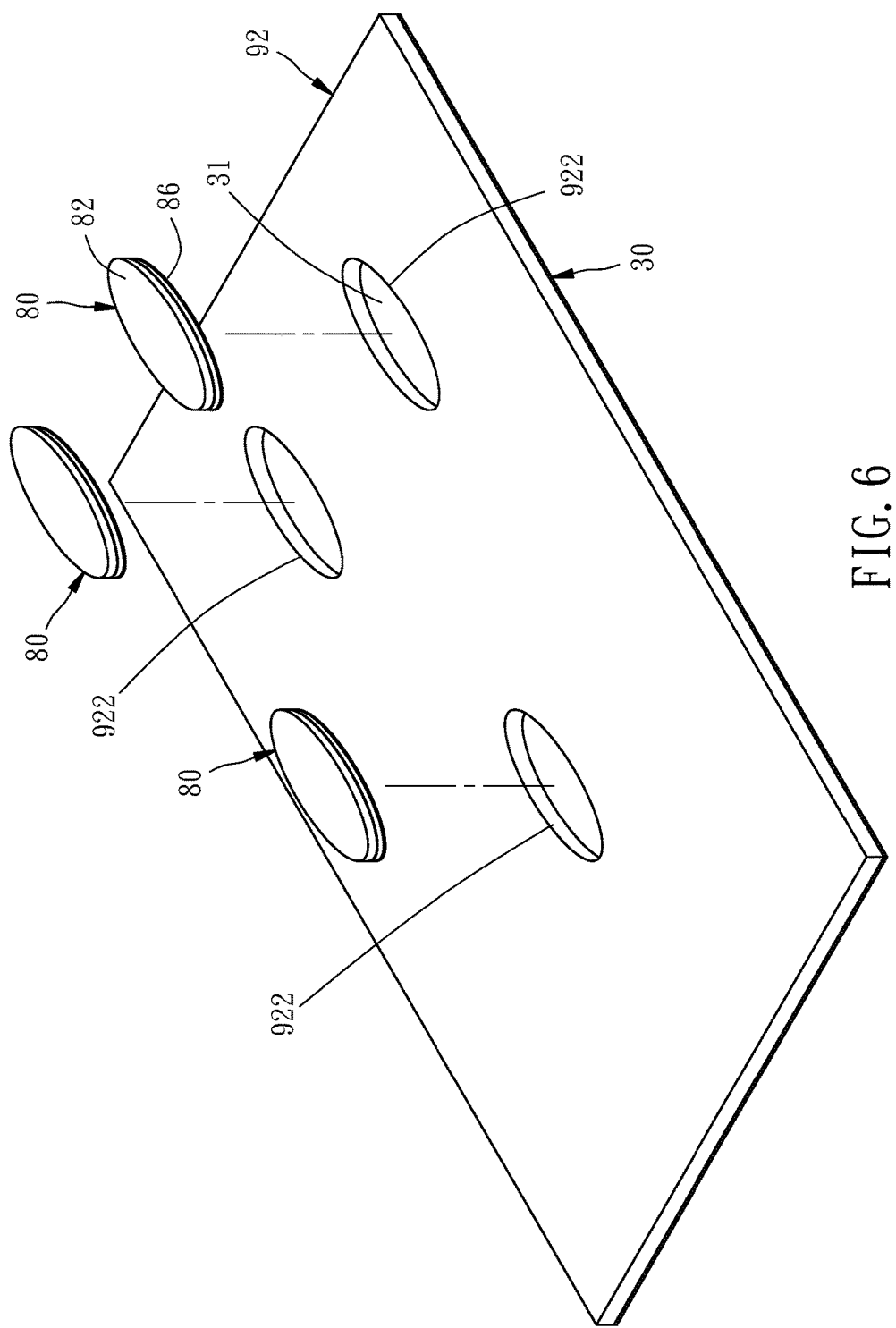
Figure 7:
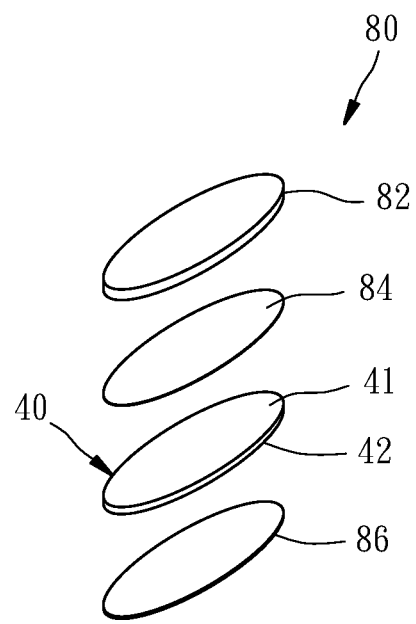
Figure 8:
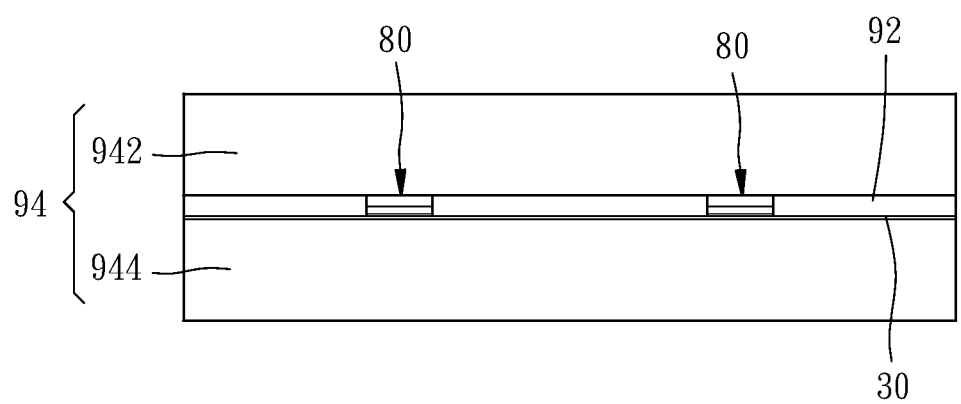

Referring to FIGS. 6-12, a second preferred embodiment of the present invention provides another method of manufacturing the aforesaid main body 10 of the bicycle saddle. The method includes the following steps.

a) As shown in FIGS. 6-8, glue three piece materials 80 (equal in amount to the auxiliary functional pieces 40), each of which includes the auxiliary functional piece 40, to the contacting surface 31 of the cover layer 30.

As shown in FIG. 7, each of the piece materials 80 in this embodiment includes not only the auxiliary functional piece 40, but also a sacrifice piece 82, a double-sided tape 84 and a hot melt adhesive film 86. The sacrifice piece 82 may, but not limited to, be made of cardboard. The hot melt adhesive film 86 may, but not limited to, be made of thermoplastic polyurethane (hereinafter referred to as TPU). The sacrifice piece 82 is glued to the functional surface 41 of the auxiliary functional piece 40 by means of the double-sided tape 84. The hot melt adhesive film 86 is disposed on a gluing surface 42 of the auxiliary functional piece 40.

Figure 9:
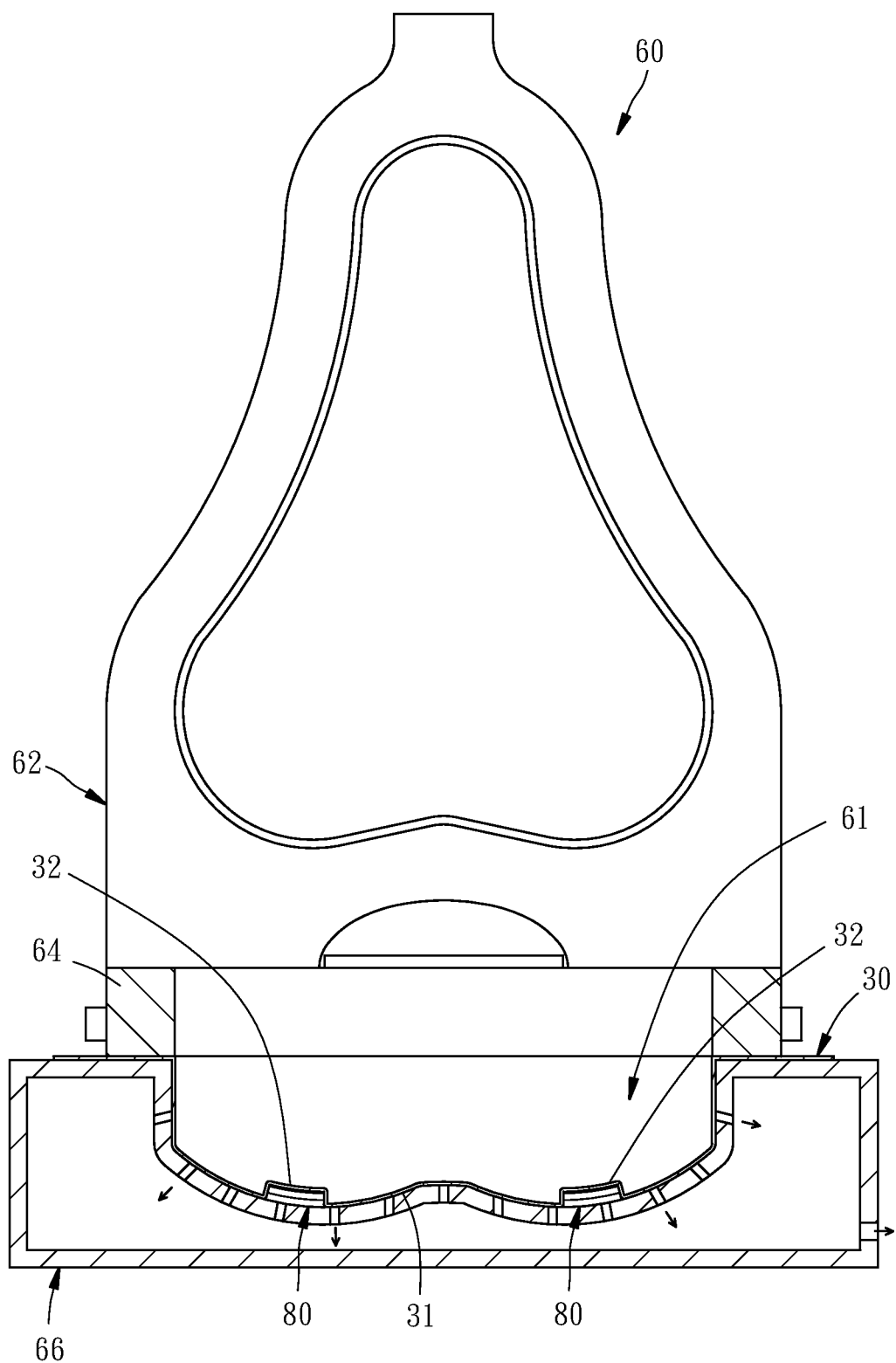
Figure 10:
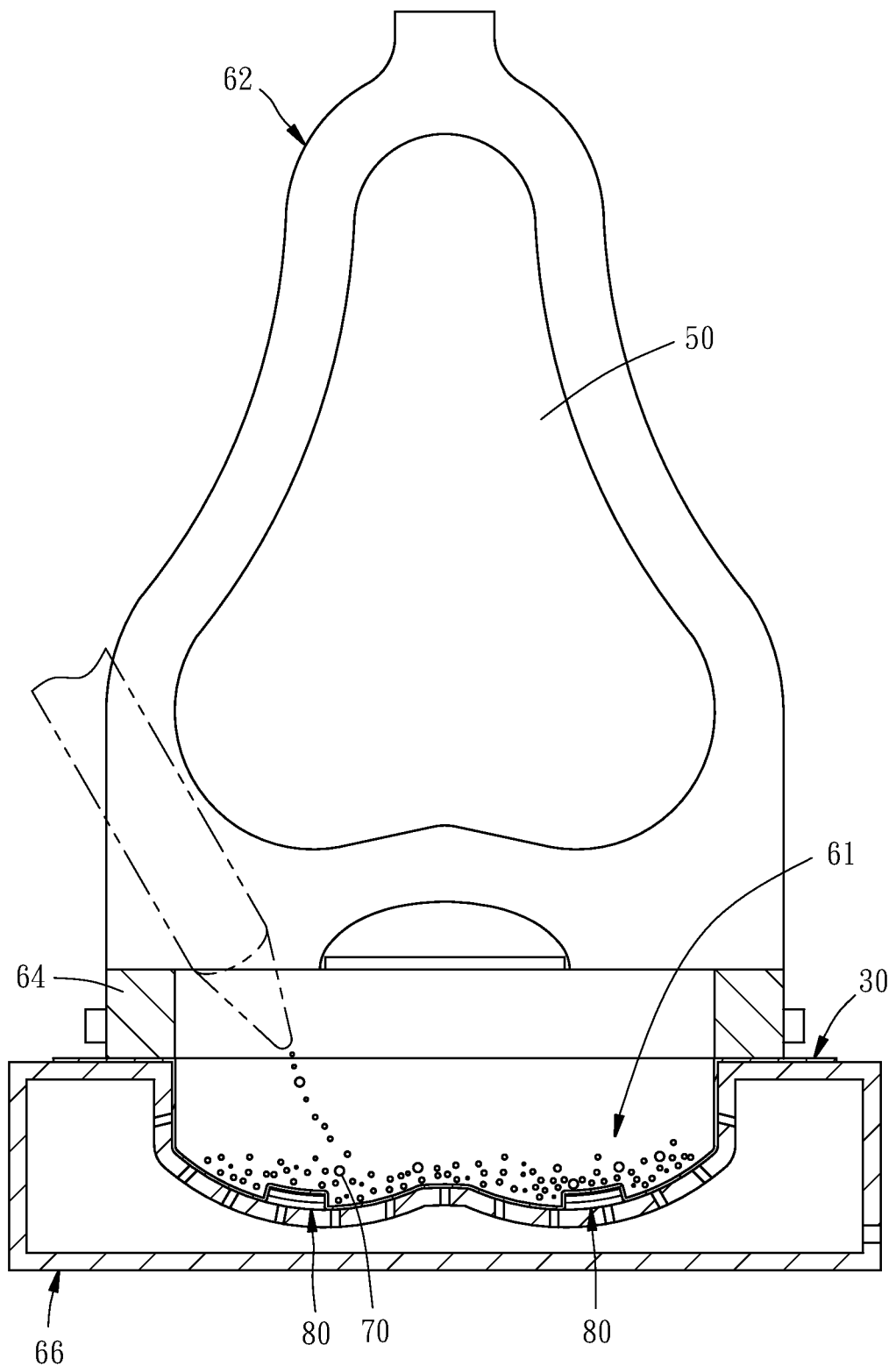
Figure 11:
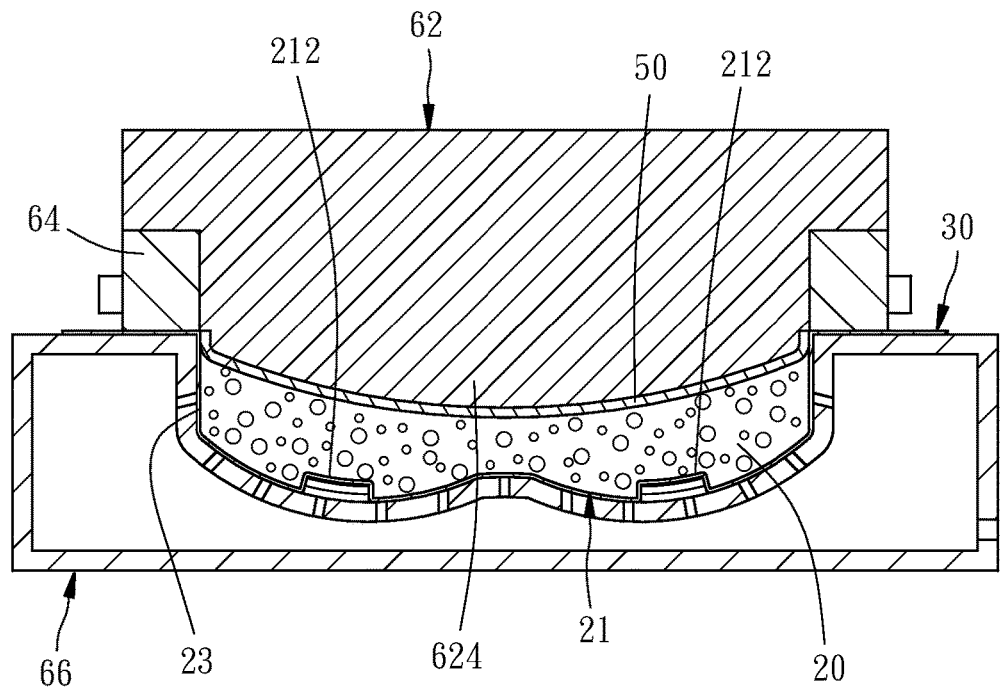
Figure 12:
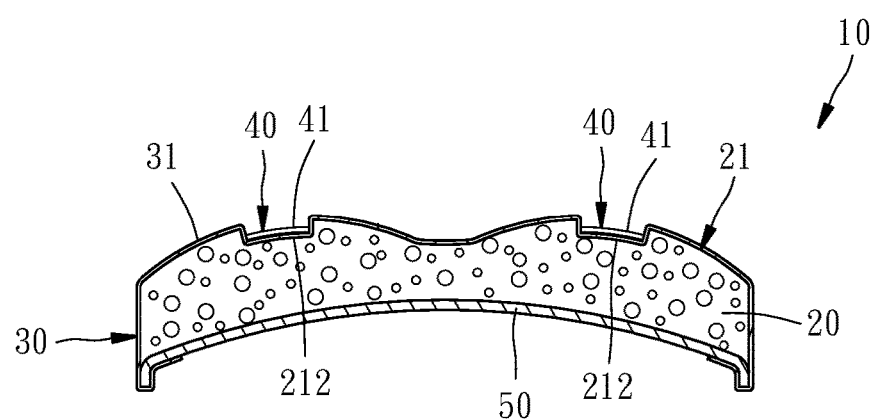

As shown in FIG. 6, in the step a) a jig 92, which has three through holes 922 shaped complementarily to the piece materials 80, is disposed on the contacting surface 31 of the cover layer 30, and then the piece materials 80 are respectively disposed in the through holes 922 in such a way that the hot melt adhesive films 86 are in contact with the contacting surface 31. After that, as shown in FIG. 8, the jig 92, the cover layer 30 and the piece materials 80 are disposed between upper and lower dies 942, 944 of a thermocompression mold 94 and then thermocompressed, so that the auxiliary functional pieces 40 are glued to the contacting surface 31 of the cover layer 30 by means of the hot melt adhesive films 86. In practice, this thermocompressing process is performed at the temperature of 105° C. for about 15 seconds; after that, the cover layer 30 and the piece materials 80 are cooled down at the room temperature for at least 3-4 seconds.

b) As shown in FIG. 9, attach the contacting surface 31 of the cover layer 30 to an inner wall 612 of a mold cavity 61 of a forming mold 60 by vacuum suction in a way that the piece materials 80 prop up parts of the cover layer 30 to form the parts of the cover layer 30 into the concave areas 32. This step is similar to the step a) of the method in the aforesaid first preferred embodiment, thereby not repeatedly described here.

c) As shown in FIGS. 10-11, heat a base material 70 that is filled in the mold cavity 61 of the forming mold 60 to form the base material 70 into the elastomer 20 in a way that the elastomer 20 is formed with the recesses 212 corresponding in shape to the piece materials 80 and the cover layer 30 is combined with the elastomer 20. This step is similar to the step b) of the method in the aforesaid first preferred embodiment, thereby not repeatedly described here.

d) As shown in FIG. 12, take the combination of the cover layer 30, the elastomer 20 and the piece materials 80 out of the mold cavity 61, and expose the auxiliary functional pieces 40 on the contacting surface 31 of the cover layer 30.

Because the piece material 80 in this embodiment includes the sacrifice piece 82 disposed on the functional surface 41 of the auxiliary functional piece 40, in the step d) the sacrifice piece 82 should be removed from the auxiliary functional piece 40 to make the functional surface 41 of the auxiliary functional piece 40 be exposed on the contacting surface 31 of the cover layer 30. In this way, each of the auxiliary functional pieces 40 is completely accommodated in the concave area 32, so each of the functional surfaces 41 is also accommodated in the concave area 32.

In other words, the piece material 80 having the sacrifice piece 82 is used in the aforesaid manufacturing process and the sacrifice piece 82 is removed in the step d), so that in the finished main body 10 of the bicycle saddle, the functional surface 41 of the auxiliary functional piece 40 is a little lower than the contacting surface 31 seen by the user. In this way, the whole auxiliary functional piece 40 is accommodated in the concave area 31, so the friction between the user and the contacting surface 31 of the cover layer 30 is less possible to cause the auxiliary functional piece 40 to escape or peel off. However, the present invention is not limited to have the aforesaid feature, so the piece material 80 is not limited to include the sacrifice piece 82. Besides, in the step a) of this embodiment, the piece material 80 is not limited to in the hot melt adhesive piece 86 or be glued to the cover layer 30 by thermocompression. For example, a glue may be applied between the gluing surface 42 of the auxiliary functional piece 40 and the cover layer 30 to make the piece material 80 without the hot melt adhesive piece 86 be glued to the cover layer 30 firmly. The piece material 80 is also not limited to be disposed on the cover layer 30 by means of the jig 92. However, the way of gluing the auxiliary functional piece 40 to the cover layer 30 by means of the hot melt adhesive piece 86 and disposing the piece material 80 on the cover layer 30 by means of the jig 92, such as that provided in this embodiment, can assure that the auxiliary functional piece 40 is glued to the contacting surface 31 of the cover layer 30 firmly and disposed on the required position of the cover layer 30 precisely.

In the aforesaid main body 10 of the bicycle saddle of the present invention, the cover layer 30 provides appropriate effect because of having the concave areas 32, and also provides riding comfort to the user. Besides, the auxiliary functional pieces 40 are less possible to escape or peel off because of being embedded in the concave areas 32 of the cover layer 30. Furthermore, the auxiliary functional pieces 40 may be anti-slip pieces for improving the anti-slip effect of the main body 10 of the bicycle saddle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A main body of a bicycle saddle, the main body comprising:
   an elastomer having a top surface provided with a recess;
   a cover layer covering the top surface of the elastomer and having a contacting surface for being contacted by a user, and a concave area corresponding to the recess; and
   an auxiliary functional piece embedded in the concave area.

2. The main body of the bicycle saddle as claimed in claim 1, wherein the auxiliary functional piece is one of an anti-slip piece, a cooling piece, a vibration-absorbing piece and a pattern piece.

3. The main body of the bicycle saddle as claimed in claim 1, wherein the auxiliary functional piece has a functional surface which is exposed on the contacting surface of the cover layer and accommodated in the concave area.

4. The main body of the bicycle saddle as claimed in claim 1, wherein the auxiliary functional piece is glued to the concave area.

5. A method of manufacturing the main body of the bicycle saddle as claimed in claim 1, the method comprising the steps of:
   a) attaching a contacting surface of a cover layer to an inner wall of a mold cavity of a forming mold by vacuum suction in a way that a protrusion of the inner wall props up a part of the cover layer to form the part of the cover layer into a concave area;
   b) heating a base material that is filled in the mold cavity of the forming mold to form the base material into an elastomer in a way that the elastomer is formed with a recess corresponding in shape to the protrusion and the cover layer is combined with the elastomer; and
   c) taking a combination of the cover layer and the elastomer out of the mold cavity, and then embedding an auxiliary functional piece in the concave area of the cover layer.

6. The method as claimed in claim 5, wherein the auxiliary functional piece is one of an anti-slip piece, a cooling piece, a vibration-absorbing piece and a pattern piece.

7. The method as claimed in claim 5, wherein the auxiliary functional piece has a functional surface which is exposed on the contacting surface of the cover layer and accommodated in the concave area.

8. The method as claimed in claim 5, wherein the auxiliary functional piece is glued to the concave area.

9. A method of manufacturing the main body of the bicycle saddle as claimed in claim 1, the method comprising the steps of:
   a) gluing a piece material, which comprises an auxiliary functional piece, to a contacting surface of a cover layer;
   b) attaching the contacting surface of the cover layer to an inner wall of a mold cavity of a forming mold by vacuum suction in a way that the piece material props up a part of the cover layer to form the part of the cover layer into a concave area;
   c) heating a base material that is filled in the mold cavity of the forming mold to form the base material into an elastomer in a way that the elastomer is formed with a recess corresponding in shape to the piece material and the cover layer is combined with the elastomer; and
   d) taking a combination of the cover layer, the elastomer and the piece material out of the mold cavity, and exposing the auxiliary functional piece on the contacting surface of the cover layer.

10. The method as claimed in claim 9, wherein the piece material comprises a sacrifice piece glued to a functional surface of the auxiliary functional piece; in the step d), the sacrifice piece is removed from the auxiliary functional piece so that the functional surface of the auxiliary functional piece is exposed on the contacting surface of the cover layer and accommodated in the concave area.

11. The method as claimed in claim 10, wherein the sacrifice piece is made of cardboard.

12. The method as claimed in claim 10, wherein the sacrifice piece is glued to the functional surface of the auxiliary functional piece by a double-sided tape.

13. The method as claimed in claim 9, wherein the piece material comprises a hot melt adhesive film disposed on a gluing surface of the auxiliary functional piece; in the step a), the piece material is thermocompressed so that the auxiliary functional piece is glued to the contacting surface of the cover layer by the hot melt adhesive film.

14. The method as claimed in claim 13, wherein in the step a), the auxiliary functional piece is glued to the contacting surface of the cover layer by the hot melt adhesive film by a way that a jig is disposed on the contacting surface of the cover layer, the piece material is disposed in a through hole of the jig, and then the jig, the cover layer and the piece material are thermocompressed.

15. The method as claimed in claim 9, wherein in the step a), the piece material is glued to the contacting surface of the cover layer by a way that a jig is disposed on the contacting surface of the cover layer and the piece material is disposed in a through hole of the jig.

16. The method as claimed in claim 9, wherein the auxiliary functional piece is one of an anti-slip piece, a cooling piece, a vibration-absorbing piece and a pattern piece.

17. The method as claimed in claim 9, wherein the auxiliary functional piece has a functional surface which is exposed on the contacting surface of the cover layer and accommodated in the concave area.

18. The method as claimed in claim 9, wherein the auxiliary functional piece is glued to the concave area.

* * * * *